(12) United States Patent
Gupta et al.

(10) Patent No.: US 10,240,447 B2
(45) Date of Patent: *Mar. 26, 2019

(54) METHOD FOR OPTIMIZING CONDUCTIVITY IN A HYDRAULIC FRACTURING OPERATION

(71) Applicant: Baker Hughes, a GE company, LLC, Houston, TX (US)

(72) Inventors: D. V. Satyanarayana Gupta, The Woodlands, TX (US); Jimie DeVon Lemons, Houston, TX (US); William D. Holcomb, The Woodlands, TX (US); Harold Dean Brannon, Magnolia, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/494,030

(22) Filed: Sep. 23, 2014

(65) Prior Publication Data

US 2015/0083420 A1 Mar. 26, 2015

Related U.S. Application Data

(60) Provisional application No. 61/882,858, filed on Sep. 26, 2013.

(51) Int. Cl.
*E21B 43/267* (2006.01)
*E21B 43/00* (2006.01)
*C09K 8/80* (2006.01)

(52) U.S. Cl.
CPC .......... *E21B 43/267* (2013.01); *C09K 8/805* (2013.01); *E21B 43/006* (2013.01)

(58) Field of Classification Search
CPC .............................. E21B 43/267; C09K 8/805
See application file for complete search history.

(56) References Cited

U.S. PATENT DOCUMENTS

| 2,838,116 A | 6/1958 | Clark, Jr. et al. |
| 3,592,266 A | 7/1971 | Tinsley |

(Continued)

FOREIGN PATENT DOCUMENTS

CN 102168545 A 3/2011

OTHER PUBLICATIONS

F. Guo, N.R. Morgenstern, J.D. Scott; "Interpretation of Hydraulic Fracturing Breakdown Pressure"; Int. J. Rock Mech. Sci. & Geomech. Abstr; 1993; 10 pgs; vol. 30, No. 6; Pergamon Presss Ltd; Great Britain.

(Continued)

*Primary Examiner* — Andrew Sue-Ako
(74) *Attorney, Agent, or Firm* — Marc L. Delflache; Jones Delflache LLP

(57) ABSTRACT

A method of distributing proppant in a spatial arrangement throughout a created or enlarged fracture by pumping into a subterranean formation penetrated by a well multiple stages of fracturing fluid wherein a fluid laden with proppant is pumped into the well and a fluid substantially free of proppant is then pumped into the well; the fluid of the fluid laden with proppant and the fluid substantially free of proppant being the same. Vertically extending pillars are created within the formation. Fluid produced from the hydrocarbon-bearing reservoir is then flowed at least partially through channels between the vertically extending pillars.

12 Claims, 7 Drawing Sheets

(56) References Cited

U.S. PATENT DOCUMENTS

| | | | |
|---|---|---|---|
| 3,664,420 A * | 5/1972 | Graham | C09K 8/80 166/280.2 |
| 3,850,247 A | 11/1974 | Tinsley | |
| 4,043,395 A | 8/1977 | Every et al. | |
| 4,078,609 A | 3/1978 | Pavlich | |
| 4,245,702 A | 1/1981 | Haafkens et al. | |
| 4,442,897 A | 4/1984 | Crowell | |
| 4,714,114 A * | 12/1987 | Jones | E21B 43/267 166/280.1 |
| 4,823,875 A * | 4/1989 | Hill | E21B 43/263 166/280.1 |
| 4,916,946 A | 4/1990 | Cameron | |
| 5,036,919 A | 8/1991 | Thomas et al. | |
| 6,399,546 B1 | 6/2002 | Chang et al. | |
| 6,435,277 B1 | 8/2002 | Qu et al. | |
| 6,776,235 B1 | 8/2004 | England | |
| 6,828,280 B2 | 12/2004 | England et al. | |
| 6,881,709 B2 | 4/2005 | Nelson et al. | |
| 7,119,050 B2 | 10/2006 | Chang et al. | |
| 7,210,528 B1 | 5/2007 | Brannon et al. | |
| 7,213,651 B2 | 5/2007 | Brannon et al. | |
| 7,255,169 B2 | 8/2007 | van Batenburg et al. | |
| 7,261,160 B2 | 8/2007 | Welton et al. | |
| 7,288,505 B2 | 10/2007 | Chang et al. | |
| 7,494,711 B2 | 2/2009 | Kaufman et al. | |
| 7,726,399 B2 | 6/2010 | Brannon et al. | |
| 8,061,424 B2 | 11/2011 | Willberg et al. | |
| 8,071,511 B2 | 12/2011 | Welton et al. | |
| 8,183,181 B1 | 5/2012 | Gupta et al. | |
| 8,205,675 B2 | 6/2012 | Brannon et al. | |
| 8,448,706 B2 | 5/2013 | Hughes et al. | |
| 8,459,353 B2 | 6/2013 | Hughes et al. | |
| 8,479,816 B2 | 7/2013 | Lesko | |
| 9,429,006 B2 * | 8/2016 | Brannon | E21B 43/267 |
| 2004/0120847 A1 * | 6/2004 | Dijkhuizen | C23F 11/173 422/7 |
| 2005/0051328 A1 | 3/2005 | Wilson | |
| 2006/0073980 A1 | 4/2006 | Brannon et al. | |
| 2006/0196659 A1 * | 9/2006 | Jee | C12N 13/00 166/250.01 |
| 2006/0289166 A1 | 12/2006 | Stromquist et al. | |
| 2008/0108524 A1 * | 5/2008 | Willberg | C09K 8/035 507/225 |
| 2008/0149329 A1 * | 6/2008 | Cooper | E21B 43/267 166/250.01 |
| 2009/0029880 A1 * | 1/2009 | Berry | C09K 8/04 507/240 |
| 2009/0044945 A1 * | 2/2009 | Willberg | C09K 8/706 166/308.1 |
| 2009/0260828 A1 | 10/2009 | Kubala et al. | |
| 2011/0036571 A1 | 2/2011 | Vitalievich et al. | |
| 2011/0114318 A1 | 5/2011 | Ezell et al. | |
| 2011/0120713 A1 | 5/2011 | Todd et al. | |
| 2011/0152135 A1 | 6/2011 | Chen et al. | |
| 2011/0180259 A1 * | 7/2011 | Willberg | C09K 8/68 166/280.2 |
| 2011/0240293 A1 * | 10/2011 | Lesko | C09K 8/665 166/280.1 |
| 2012/0000662 A1 | 1/2012 | Liskowitz et al. | |
| 2012/0024530 A1 | 2/2012 | Todd et al. | |
| 2012/0048554 A1 | 3/2012 | Hughes et al. | |
| 2012/0125617 A1 | 5/2012 | Gu et al. | |
| 2012/0247764 A1 | 10/2012 | Panga et al. | |
| 2012/0305247 A1 | 12/2012 | Chen et al. | |
| 2012/0325472 A1 * | 12/2012 | Litvinets | C09K 8/665 166/280.1 |
| 2013/0161003 A1 * | 6/2013 | Makarychev-Mikhailov | C09K 8/685 166/280.1 |
| 2013/0161033 A1 | 6/2013 | Farmer et al. | |
| 2014/0332213 A1 * | 11/2014 | Zhou | C09K 8/805 166/280.2 |

OTHER PUBLICATIONS

Ahmed M. Gomaa, Qi Qu, Russell Maharidge, Scott Nelson, Ted Reed; "New Insights Into Hydraulic Fracturing of Shale Formations"; IPTC 17594; 2014; 17 pgs; White Librarian; Richardson, Texas.

T.D. Pugh, Jr, B.W. McDaniel, R.L. Seglem; "A New Fracturing Technique for Dean Sand"; SPE 6378; Feb. 1978; 6 pgs; Society of Petroleum Engineers of AIME.

J.H. Zhang, Z.H.Liu S.X.Qu; "Simulational Study of Viscous Fingering in Fractured Reservoirs"; SPE 50906; 1998; 6 pgs; White Librarian; Richardson, Texas.

Antonius D. Arinto, Sukinto Anggono, Hasyim Nur, Mezlul, Arfie, Ron Dusterhoft, Torsten Kritzler; "Unique Application of Floating Proppant to Stimulate Sandstone Formations With High Contrast in Permeability"; SPE80480; 2003; 14 pgs; White Librarian; Richardson, Texas.

C.L. Cipolla, N.R. Warpinski, M.J. Mayerhofer, E.P. Lolon, M.C. Vincent; "The Relationship Between Fracture Complexity, Reservoir Properties, and Fracture Treatment Design"; SPE 115769; 2008; 25 pgs; White Librarian; Richardson, Texas.

M. Gillard, O. Medvedev, A. Pena, A. Medvedev, F. Penacorada, E. D'Huteau; "A New Approach To Generating Fracture Conductivity"; SPE 135034; 2010; 14 pgs; White Librarian; Richardson, Texas.

J. Johnson, M. Turner, C. Weinstock, A. Pena, M. Laggan, J. Rondon, K. Lyapunov; "Channel Fracturing—A Paradigm Shift in Tight Gas Stimulation"; SPE 140549; 2011; 9 pages; White Librarian; Richardson, Texas.

Ahmed M. Gomaa, Qi Qu, Scott Nelson, Russell Maharidge; "New Insights Into Shale Fracturing Treatment Design"; SPE 167754; 2014; 16 pgs; White Librarian; Richardson, Texas.

* cited by examiner

METHOD FOR OPTIMIZING CONDUCTIVITY IN A HYDRAULIC FRACTURING OPERATION

This application claims the benefit of U.S. patent application Ser. No. 61/882,858, filed on Sep. 26, 2013, herein incorporated by reference.

FIELD OF THE DISCLOSURE

The disclosure relates to a method of fracturing wherein proppant pillars are formed and flow channels are created in between the pillars resulting in an increase in conductivity.

BACKGROUND OF THE DISCLOSURE

In a stimulation treatment of a subterranean reservoir, such as during hydraulic fracturing, a fluid is pumped into well which penetrates the reservoir at a pressure which is sufficient to create or enlarge a fracture within the reservoir. During fracturing, vertical fracture faces are held apart by the friction pressure created by the flow of the fracturing fluid. However, when the treatment ends and this friction pressure are no longer present, the fracture opening closes under the influence of tectonic stresses.

Productivity of a hydraulic fracturing treatment operation is dependent on the effectiveness of the propping agent present in the fracturing fluid. The proppant serves to prevent the fracture from closing and to hold the faces of the reservoir apart after the pumping treatment is completed. The success in keeping the fracture from closing is dependent on the strength and distribution of the proppant. Typically, the proppant bed that fills the fracture has a fluid conductivity which is hundreds of times greater than the formation. Thus, the proppant filled channel increases the effective drainage radius of the wellbore and increases the producing rate of the well.

However, beds composed of conventional proppants, such as sand, typically exhibit low flow capacity even though they provide support to hold the fracture faces apart for flow to occur between the beds.

When fracturing low-permeability reservoirs are drilled on large spacing it is advantageous to create long propped fractures. Usually, such treatments are performed using viscous fluids that are capable of transporting proppant far into the fracture with a minimum of settling. However, in order to create such long fracture lengths, a large amount of proppant and a large volume of viscous fluid are required.

Alternative methods include the use of a less viscous fluid and a proppant with a small particle size. Since fine proppant tends to slowly settle from its transport fluid, the fluid can be carried over long distances. However, proppant of small particle size has an extremely low flow capacity and a suitable C/ki ratio (the ratio of fracture conductivity to formation permeability) is often unlikely. Thus, this method is often unsatisfactory.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for a method for effectively propping low permeability reservoirs where long propped fractures are required and having one or more of the attributes or capabilities described or shown in, or as may be apparent from, the other portions of this patent.

SUMMARY OF THE DISCLOSURE

In an embodiment of the disclosure, a method of hydraulically fracturing a hydrocarbon-bearing reservoir is provided wherein a fluid laden with proppant is pumped into a well penetrating the hydrocarbon-bearing reservoir. A fluid substantially free of proppant is then pumped into the reservoir; the fluid of the fluid laden with proppant and the fluid substantially free of proppant being the same. The steps of addition of the fluid laden with proppant and the fluid substantially free of proppant may be sequentially repeated. The addition of the fluid laden with proppant and the fluid substantially free of proppant created vertically extending pillars within the formation. Fluid produced from the hydrocarbon-bearing reservoir is then flowed at least partially through channels between the vertically extending pillars.

In another embodiment of the disclosure, a method of enhancing conductivity of a fracture within a reservoir is provided wherein the relative permeability of the reservoir is from about 1 nanodarcy to about 1 mD. In the method, a fluid laden with proppant and a fluid substantially free of proppant are sequentially pumped into a well penetrated by the reservoir. A fracture having vertically extending formation pillars and conductive channels between the formation pillars is created. The created vertical pillars may extend continuously or non-continuously within the fracture. The fluid of the fluid laden with proppant and the fluid substantially free of proppant is preferably the same.

In still another embodiment of the disclosure, a method of hydraulically fracturing a hydrocarbon-bearing reservoir having a relative permeability less than 1 mD is provided wherein alternating fluid stages are pumped into the reservoir wherein one of the stages is a fluid laden with proppant and the other stage is a fluid substantially free of proppant. Periodically spaced proppant pillars are formed within the formation. Conductive flow channels are formed between the proppant pillars. Fluid produced from the reservoir may then be flowed through the conductive flow channels.

In another embodiment of the disclosure, a method of enhancing conductivity of a fracture within a reservoir is provided wherein the relative permeability of the reservoir is from about 1 nanodarcy to about 1 mD. In the method, a fluid laden with mixture of proppants having different density and a fluid substantially free of proppant are sequentially pumped into a well penetrated by the reservoir. A fracture having vertically extending formation pillars and conductive channels between the formation pillars is created. The created vertical pillars may extend continuously or non-continuously within the fracture. The fluid of the fluid laden with proppant and the fluid substantially free of proppant is preferably the same.

In still another embodiment of the disclosure, a method of hydraulically fracturing a hydrocarbon-bearing reservoir having a relative permeability less than 1 mD is provided wherein alternating fluid stages are pumped into the reservoir wherein one of the stages is a fluid laden with mixture of proppants having mixed density and the other stage is a fluid substantially free of proppant or having a very low proppant concentration. Periodically spaced proppant pillars are formed within the formation. Conductive flow channels are formed between the proppant pillars. Fluids produced from the reservoir are then flowed through the conductive flow channels.

Accordingly, the present disclosure includes features and advantages which are believed to enable it to advance stimulation of low permeability formations. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1A:
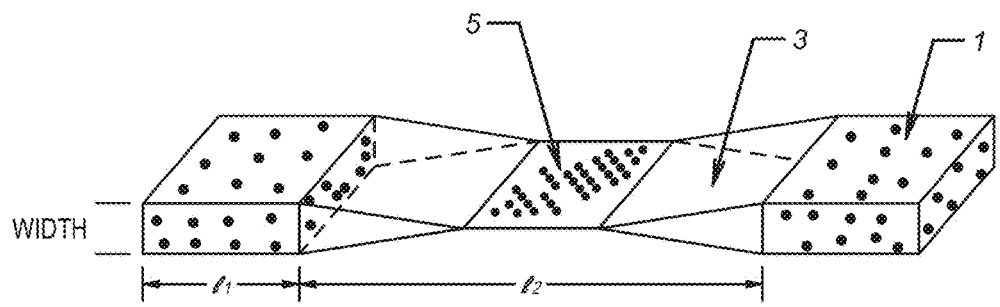
FIG. 1a and FIG. 1b depict a side view and a top view of a fracture, after closure, illustrating conductive flow channels between pillars created by the method disclosed herein.

Illustrative embodiments of the invention are described below as they might be employed in the operation and treatment of a fracturing operation. In the interest of clarity, not all features of an actual implementation are described in this specification. It will of course be appreciated that in the development of any such actual embodiment, numerous implementation and/or specific decisions must be made to achieve the specific goals of the operator, which will vary from one implementation to another. Moreover, it will be appreciated that such a development effort might be complex and time-consuming, but may nevertheless be a routine undertaking for those of ordinary skill in the art having the benefit of this disclosure. Further aspects and advantages of the various embodiments of the invention will become apparent from consideration of the following description.

Certain terms are used herein and in the appended claims to refer to particular stages. As one skilled in the art will appreciate, different persons may refer to a stage and the components of a stage by different names. This document does not intend to distinguish between components that differ or stages in name but not function. Also, the terms "including" and "comprising" are used herein and in the appended claims in an open-ended fashion, and thus should be interpreted to mean "including, but not limited to . . . "

Further, reference herein and in the appended claims to aspects in a singular tense does not necessarily limit the present disclosure or appended claims to only one such aspect, but should be interpreted generally to mean one or more, as may be suitable and desirable in each particular instance.

The disclosure relates to a method of distributing proppant in a spatial arrangement throughout a created or enlarged fracture by pumping into a subterranean formation penetrated by a well multiple stages of fracturing fluid. In a first stage, a fluid laden with proppant is pumped into the formation. In a second stage, a fluid substantially free of proppant (a sweep fluid) is pumped into the formation. The term "substantially free of proppant" shall refer to the fluid being void of proppant or containing no more proppant than that needed to establish a partial monolayer within the fracture. In some instances, the amount of proppant in the fluid may be at a concentration which is insufficient for the material to function as a proppant and hold the fracture open. For instance, the amount of proppant in the fluid may be less than or equal to 0.1 pounds per gallon (ppg).

In a preferred embodiment, the first stage may be pumped into the formation sequentially followed by the pumping of a the second stage. In another embodiment, multiple first stages may be consecutively be pumped into the formation followed by the second stage; a first stage may be pumped into the followed by multiple consecutively pumped second stages; or multiple first stages may be consecutively pumped into the formation followed by multiple consecutively pumped second stages. (It is understood that pumping of a first stage may precede or be subsequent to pumping of the second stage and that reference to "first stage" and "second stage" does not restrict the pumping of a first stage prior to a second stage or the pumping of a second stage prior to a first stage. Thus, pumping of a stage comprising a fluid laden with proppant may occur prior to or subsequent to the pumping of the sweep fluid.) Thus, multiple pumping stages of fluid laden with proppant may occur prior to or subsequent to the pumping of one or more stages comprising the sweep fluid.

The disclosure provides a method for forming multiple proppant beds at periodic points of support. Such beds hold the fracture faces of the formation apart. These periodic beds distributed over the fracture surface are capable of supporting the closure load and may be irregularly shaped pillars.

Thus, a high percentage of the fracture remains open without proppant by use of the method disclosed herein. Using the method of the disclosure, fracture faces do not touch for a distance away from the edge of the bed because of the support provided by the bed. In a preferred embodiment, stages or pillars of proppant are spaced so that the fracture faces just touch midway between them. This bed pattern may be repeated across the fracture height. At in-situ conditions, irregularly shaped propped sections may be distributed throughout the fracture. The proppant beds are permeable, as in a conventional proppant distribution but, in addition, the open fracture between beds has a flow capacity many times greater than that of the beds.

Figure 1B:
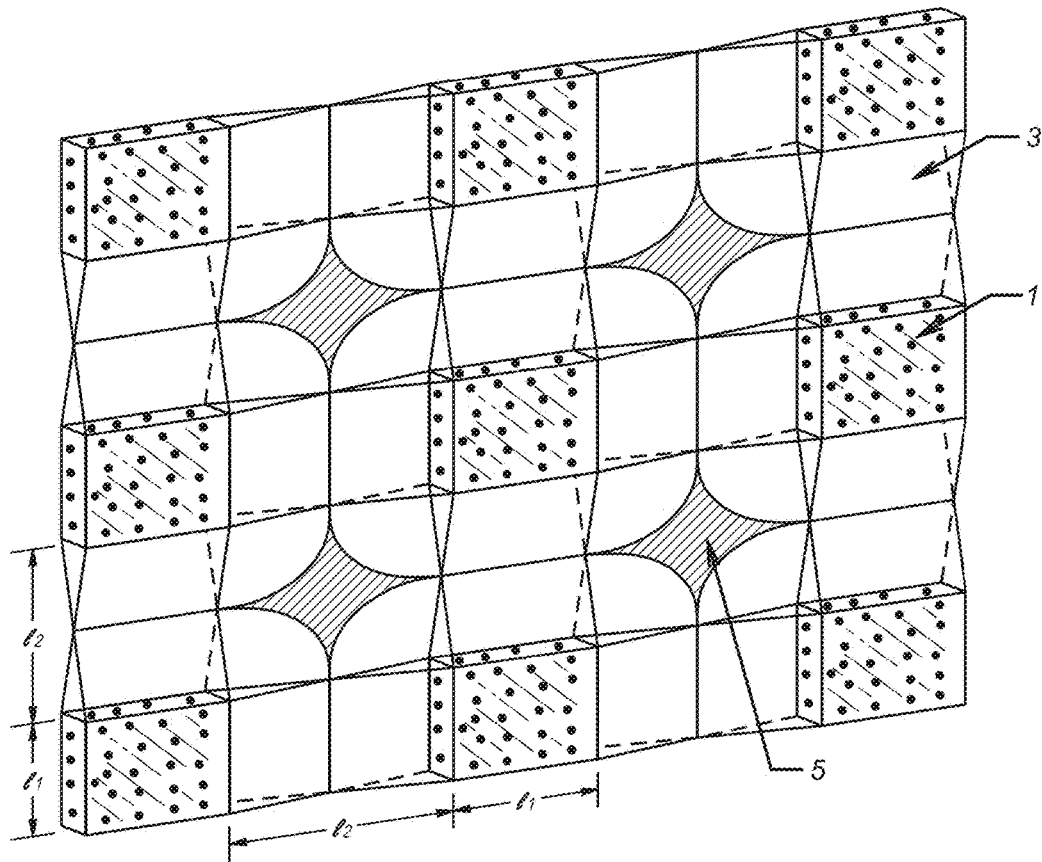

The formation of proppant pillars 1 which hold fracture surfaces apart is illustrated in FIG. 1a (top view) and FIG. 1b (cross-sectional view). As depicted, proppant particulates define a proppant bed in the form of vertically extended proppant pillars 1. Conductive flow channels 3 between the proppant pillars allow for the flow of produced fluid between the periodically spaced proppant pillars. In addition, produced fluid may flow through proppant pillars 1 especially when particulates comprising proppant pillars 1 are not closely packed. Where pillars 1 are unable to provide the support the hold the fracture open, formation faces 5 touch each other. The open portion of the fracture defined by conductive flow channels 3 may conduct fluid even if a portion of the proppant pillars crush and the flow capacity of the proppant bed is reduced a to low value.

The method is especially suitable for use in deep, highly stressed wells where proppants have insufficient strength to withstand loads without crushing. Further, the method disclosed herein may furnish the conductivity needed to effectively stimulate high-permeability zones in low permeability formations, including tight gas shale reservoirs. Such reservoirs include shale formation and coal bed wells for the production of methane. The relative permeability of such reservoirs is generally less than 10 mD. In most instances, the relative permeability of such reservoirs is between from about 1 nanodarcy to about 1 mD. In an embodiment, the permeability of the reservoir is more typically less than 0.1 mD. As such, productivity of low permeability formations is enhanced by use of the fracturing operation described herein.

The formation may first be propagated by introducing into the formation a fluid at a pressure sufficient to propagate the fracture. The stage, which initiates the fracture, may include any of the proppants defined in this disclosure. In the treatment of low permeability formations, the fracture may be propagated by the pumping of slickwater into the formation.

In some instances, it is desirable to pump into the formation an acid in order to etch the surface of the formation prior to pumping a stage comprising a fluid laden with proppant.

The physical properties of the sweep fluid and the fluid of the proppant stage are typically about the same. For instance, the sweep fluid and the fracturing fluid containing the proppant have approximately the same density. The viscosity of the sweep fluid and the fracturing fluid is approximately the same. For instance, where both proppant laden fluid and sweep fluid have a viscosity greater than about 10,000 cP at a shear rate of 0.01 $sec^{-1}$, the viscosity of the two fluids may be substantially the same. Further, the rate of pumping of the fluid laden with proppant and the sweep fluid is substantially the same. Likewise, the weight of the fluid laden with proppant and the weight of the sweep fluid may be substantially the same.

The concentration of proppant in the fluid laden with proppant is preferably the same for each stage of proppant laden fluid pumped into the formation. Thus, when stages of fluid laden with proppant are pumped into the formation, the amount of proppant in the fluid for each of the stages is preferably the same.

Further, the amount of fluid pumped into the formation of the fluid laden with proppant and the sweep fluid in alternate stages is typically the same. While the amount of fluid pumped into the formation may be increased or decreased during the pumping operation, typically the amount of fluid in at least two or more successive pumping stages is the same. In an embodiment, alternating stages of proppant laden fluid and sweep fluid may be pumped into the formation wherein the volume of the each of the stages remains the same. After two or more successive repetitions of proppant laden fluid followed by sweep fluid, the volume of fluid pumped into the formation may be increased or decreased and the process conducted. An exemplary procedure may be as set forth in Table I below:

TABLE 1

| Stage | Fluid | Proppant | Fluid Volume, Gallons |
|---|---|---|---|
| 1 | Slickwater | No | 9,000 |
| 2 | FF | Yes | 4000 |
| 3 | FF | No | 4000 |
| 4 | FF | Yes | 4000 |
| 5 | FF | No | 4000 |
| 6 | FF | Yes | 4000 |
| 7 | FF | No | 4000 |
| 8 | FF | Yes | 4000 |
| 9 | FF | No | 4000 |
| 10 | FF | Yes | 8500 |
| 11 | FF | No | 8500 |
| 12 | FF | Yes | 8500 |
| 13 | FF | No | 8500 |
| 14 | FF | Yes | 8500 |
| 15 | FF | No | 8500 |
| 16 | Slickwater | No | |

The flow capacity of the open channel between the pillars is several orders of magnitude greater than that offered by a bed of proppant which results from a conventional fracturing operation. Thus, the open channel between the pillars offers a much higher flow capacity than a propped fracture resulting from conventional fracturing operations.

Typically, prior to pumping any stage, a residence time for the previous stage is allowed to occur. Such residence times allow for the previous stage to interact with the environment in the formation to which the previous stage has been exposed. Typically, the amount of residence times between stages is between from about 1 hour to 5 hours.

The pillars may be stabilized by the use of proppants of varying density as well as the viscosifying agent which defines the fracturing fluid. It is desirable to define a perfect transport fluid for the fracturing operation which, under static conditions, keeps proppant from settling within the fluid laden with proppant. Other additives offering different densities may also be used in order to maintain suspension of proppant within the transport fluid under static conditions for extended periods of time.

In a preferred embodiment, the fluid of the proppant laden fluid and the fluid of the sweep fluid are the same fluid and are selected such that the proppant may be suspended and transported to the targeted site of the formation.

The fluid is a viscosifying agent which may be a viscosifying polymer or a viscoelastic material. The fluid may be foamed. Such fluids are capable of maintaining the pillars even where closure time for the fracture is long. This is particularly the case with tight gas formations or ultra-low permeability shale formations.

Suitable viscosifying polymers are such hydratable polymers like, for example, one or more polysaccharides capable of forming linear or crosslinked gels. These include galactomannan gums, guars, derivatized guars, cellulose and cellulose derivatives, starch, starch derivatives, xanthan, derivatized xanthan and mixtures thereof.

Specific examples include, but are not limited to, guar gum, guar gum derivative, locust bean gum, welan gum, karaya gum, xanthan gum, scleroglucan, diutan, cellulose and cellulose derivatives, etc. More typical polymers or gelling agents include guar gum, hydroxypropyl guar (HPG), carboxymethyl hydroxypropyl guar (CMHPG), hydroxyethyl cellulose (HEC), carboxymethyl hydroxyethyl cellulose (CMHEC), carboxymethyl cellulose (CMC), dialkyl carboxymethyl cellulose, etc. Other examples of polymers include, but are not limited to, phosphomannans, scerolglucans and dextrans. In a preferred embodiment, carboxymethyl hydroxypropyl guar is employed.

The fluid containing the viscosifying polymer may further include a crosslinking agent. In this regard, any crosslinking agent suitable for crosslinking the hydratable polymer may be employed. Examples of suitable crosslinking agents include metal ions such as aluminum, antimony, zirconium and titanium-containing compounds, including organotitanates. Examples of suitable crosslinkers may also be found in U.S. Pat. No. 5,201,370; U.S. Pat. No. 5,514,309, U.S. Pat. No. 5,247,995, U.S. Pat. No. 5,562,160, and U.S. Pat. No. 6,110,875, incorporated herein by reference.

In a preferred embodiment, the viscosifying polymer is a guar or derivatized guar. Suitable crosslinkers for guar based polymers include borate ion donating materials. Examples of borate-based crosslinkers include, but are not limited to, organo-borates, mono-borates, poly-borates, mineral borates, etc.

A particularly preferred derivatized guar is CMHPG employed with a zirconium-based crosslinker. Such a polymer fracturing fluid is available as MEDALLION FRAC 4000 HT from Baker Hughes Incorporated. Other examples of suitable polymer fracturing fluids that may be employed include non crosslinked guar gelled water (such as AQUA FRAC), methanol crosslinked HPG (such as METHOFRAC), borate crosslinked guar (such as VIKING, VIKING D and SPECTRAFRAC G), crosslinked hydrochloric acid-based acrylic polymer (such as XL ACID II), all of the designated products being made available from Baker Hughes Incorporated.

The viscoelastic material referenced herein may be micellular, such as worm-like micelles, surfactant aggregations or vesicles, lamellar micelles, etc. Such micelles include those set forth in U.S. Pat. Nos. 6,491,099; 6,435,277; 6,410, 489; and 7,115,546.

Suitable viscoelastic surfactants include cationic, amphoteric and anionic surfactants. Suitable cationic surfactants include those having only a single cationic group which may be of any charge state (e.g., the cationic group may have a single positive charge or two positive charges). The cationic group preferably is a quaternary ammonium moiety (such as a linear quaternary amine, a benzyl quaternary amine or a quaternary ammonium halide), a quaternary sulfonium moiety or a quaternary phosphonium moiety or mixtures thereof. Preferably the quaternary group is quaternary ammonium halide or quaternary amine, most preferably, the cationic group is quaternary ammonium chloride or a quaternary ammonium bromide.

The amphoteric surfactant preferably contains a single cationic group. The cationic group of the amphoteric surfactant is preferably the same as those listed in the paragraph above. The amphoteric surfactant may be one or more of glycinates, amphoacetates, propionates, betaines and mixtures thereof. Preferably, the amphoteric surfactant is a glycinate or a betaine and, most preferably, the amphoteric surfactant is a linear glycinate or a linear betaine.

The cationic or amphoteric surfactant has a hydrophobic tail (which may be saturated or unsaturated). Preferably the tail has a carbon chain length from about $C_{12}$-$C_{18}$. Preferably, the hydrophobic tail is obtained from a natural oil from plants, such as one or more of coconut oil, rapeseed oil and palm oil. Exemplary of preferred surfactants include N,N,N trimethyl-1-octadecammonium chloride: N,N,N trimethyl-1-hexadecammonium chloride; and N,N,N trimethyl-1-soyaammonium chloride, and mixtures thereof.

Exemplary of anionic surfactants are sulfonates, phosphonates, ethoxysulfates and mixtures thereof. Preferably the anionic surfactant is a sulfonate. Most preferably the anionic surfactant is a sulfonate such as sodium xylene sulfonate and sodium naphthalene sulfonate.

In one preferred embodiment, a mixture of surfactants are utilized to produce a mixture of (1) a first surfactant that is one or more cationic and/or amphoteric surfactants set forth above and (2) at least one anionic surfactant set forth above.

Preferably where the viscoelastic material is a viscoelastic material it is composed of a mixture of materials, such as those disclosed in U.S. Pat. No. 6,875,728 or 6,410,489 (herein incorporated by reference), the amount of the cationic/amphoteric material and the amount of anionic material which are used is preferably sufficient to neutralize, or at least essentially neutralize, the charge density of the fluid. Accordingly, if the cationic surfactant is N,N,N, trimethyl-1-octadecammonium chloride and the anionic surfactant is sodium xylene sulfonate, then the surfactants may be combined in a ratio from about 1:4 to about 4:1 by volume to obtain a clear viscoelastic gel which is capable of transporting a proppant. Typical of such viscoelastic materials are AquaStar, a product of Baker Hughes Incorporated.

The relative amount of the viscosifying agent within the fluid comprising the proppant laden fluid and the sweep fluid may be determined based upon the desired viscosity of the fluid. Placement of the proppant beds in accordance with the disclosure typically requires a smaller quantity of viscous fluid to be pumped into the well since the treatment uses a sweep fluid as non-proppant-carrying spacer. The requisite amount of surfactant to obtain the predetermined viscosity may then be combined with the requisite amount of water to produce the fluid. Typically, the amount of viscosifying material in the proppant laden fluid and the sweep fluid is between from about 5 gpt (gallons per thousand gallons) to about 100 gpt.

In a preferred embodiment, the viscosity of the fluid is such to achieve friction reduction when pumped downhole (e.g., when pumped down tubing, work string, casing, coiled tubing, drill pipe, etc.) and to transport the proppant into the targeted location within the formation. Where flow capacity between the beds is low, relatively low viscosity fluids can be used in moderate volumes to transport small proppant particles deep within the fracture and to distribute them in the form of a series of spaced beds.

Typically, the fluid of the proppant laden fluid and the sweep fluid in each stage pumped into the formation is the same and the proppant of the proppant laden fluid of each stage pumped into the formation is the same.

Also, the method disclosed herein requires a smaller quantity of proppant than that used with the conventional fracturing operations since only a portion of the fracture contains proppant beds. Typically, the amount of proppant in the fracturing fluid is reduced by from 5 to 75 percent of the amount of proppant used with conventional fracturing operation.

In a preferred embodiment, the periodic placed proppant pillars rendered by the method disclosed herein utilize a very fine-grained proppant to form the beds and to support the fracture. Such proppants have a grain size of from about 8/12 US mesh to about 325 US mesh. Typically, the particle size of the proppant of the fluid with proppant 8/12 US mesh to about 100 US mesh. Most typically, the particle size of the proppant with the proppant system used in the invention is from about 12/20 US mesh to about 40/70 US mesh. In a preferred embodiment, fine proppants of about 100 US mesh are used.

Exemplary proppants for use in the disclosure include ceramics, sand, bauxite, alumina, minerals, nut shells, gravel, glass, resinous particles, polymeric particles, as well as combinations thereof.

Examples of ceramics include oxide-based ceramics, nitride-based ceramics, carbide-based ceramics, boride-based ceramics, silicide-based ceramics, or a combination thereof. In an embodiment, the oxide-based ceramic is silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant particles include, but are not limited to, Arizona sand, Wisconsin sand, Badger sand, Brady sand, and Ottawa sand. In an embodiment, the proppant particles made of a mineral such as bauxite are sintered to obtain a hard material. In an embodiment, the bauxite or sintered bauxite has a relatively high permeability such as the bauxite material disclosed in U.S. Pat. No. 4,713,203, the content of which is incorporated by reference herein in its entirety.

In another embodiment, the proppant is a relatively lightweight or substantially neutrally buoyant particulate material or a mixture thereof. Such proppants may be chipped, ground, crushed, or otherwise processed. By "relatively lightweight" it is meant that the proppant has an apparent specific gravity (ASG) which is less than or equal to 2.45, including those ultra lightweight proppants having an ASG less than or equal to 2.25, more preferably less than or equal to 2.0, even more preferably less than or equal to 1.75, most preferably less than or equal to 1.25 and often less than or equal to 1.05.

Naturally occurring proppant particles include nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles formed by crushing, grinding, cutting, chipping, and the like.

Suitable relatively lightweight proppants are those particulates disclosed in U.S. Pat. Nos. 6,364,018, 6,330,916 and 6,059,034, all of which are herein incorporated by reference.

Further, the relatively lightweight proppant for use in the method defined herein may be a coated porous ceramic selectively configured porous particulate, such as those set forth in U.S. Pat. No. 7,426,961, herein incorporated by reference.

In another embodiment, the proppant particles are coated, e.g., with a resin, which resist defragmentation of consolidated proppant during compression. Coating for the proppant particles include cured, partially cured, or uncured coatings of, e.g., a thermoset or thermoplastic resin.

In another embodiment, the coating is an organic compound that includes epoxy, phenolic, polyurethane, polycarbodiimide, polyamide, polyamide imide, furan resins, or a combination thereof. The phenolic resin is, e.g., a phenol formaldehyde resin obtained by the reaction of phenol, bisphenol, or derivatives thereof with formaldehyde. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosets include epoxy, phenolic (a true thermosetting resin such as resole or a thermoplastic resin that is rendered thermosetting by a hardening agent), polyester resin, polyurethanes, epoxy-modified phenolic resin, and derivatives thereof.

In an embodiment, the curing agent for the coating is nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such as tertiary amines, Lewis acids, Lewis bases; or a combination thereof.

In a preferred embodiment, the curable resin coating is a phenolic resin, epoxy resin, furan resin, phenolic formaldehyde resin, melamine formaldehyde resin, urethane resin and phenolic and furan resin mixtures.

The curable coating cures under the high pressure and temperature conditions in the subsurface reservoir. Thus, the proppant particles having the curable coating are especially useful for high pressure and high temperature wells.

In another embodiment, the proppant is a resin coated plastic, resin coated ceramic proppant or a synthetic organic particle such as nylon pellets, ceramics. Exemplary are curable resin coated plastic beads such as include polystyrene beads crosslinked with divinylbenzene (PSDVB) as well as polyamide beads such as those disclosed in such as those disclosed in U.S. Pat. No. 7,494,711, both herein incorporated by reference. In a preferred embodiment, such curable resin coated beads have an ASG less than about 2.0, more preferably less than or equal to 1.5, and exhibit high acid and chemical resistance.

In another embodiment, the proppant may be a lightweight polyamide, such as those set forth in U.S. Pat. No. 7,931,087.

In an embodiment, the proppant particles may also include a crosslinked coating. The crosslinked coating typically provides crush strength, or resistance, for the proppant particles and prevents agglomeration of the proppant particles even under high pressure and temperature conditions. In some embodiments, the proppant particles have a curable coating, which cure subsurface, e.g. downhole or in a fracture.

Further, the proppant comprising the pillar may be disposed in a superabsorbent polymer (e.g., a plurality of superabsorbent polymer particles). At in situ conditions, the superabsorbent polymer may be expanded such that in its expanded state, it is configured to break in response to a breaking condition. A plurality of proppant particles are released upon breaking of the superabsorbent polymer at in-situ conditions. The superabsorbent polymer includes a plurality of polymer chains having internal crosslinks between the chains of the superabsorbent polymer. In an embodiment, the proppant particles are included in a space between adjacent superabsorbent polymer particles. In some embodiments, the proppant particles are disposed in the space and confined by intra-particle crosslinks of the superabsorbent polymer particles. It is contemplated that the fluid surrounds an exterior of the superabsorbent polymer, its interior space, inside the particles, or a combination thereof.

The superabsorbent polymer is a crosslinked, neutralized or partially neutralized polymer that is capable of absorbing large amounts of aqueous liquids, such as water, brine, acid, or base, with swelling and the formation of a gel or viscous material, and retains the absorbed fluid under a certain pressure or temperature. The superabsorbent polymer has internal crosslinks, surface crosslinks, or a combination thereof. Superabsorbent polymer particles are particles of superabsorbent polymers or superabsorbent polymer compositions. The acronym SAP may be used in place of superabsorbent polymer, superabsorbent polymer composition, and particles or fibers (and the like) herein.

The SAP has a hydrophilic network that retains large amounts of aqueous liquid relative to the weight of the SAP. In an embodiment, the SAPs herein are a variety of organic polymers that react with or absorb water and swell when contacted with an aqueous fluid.

Non-limiting examples of such superabsorbent polymer particles are a polysaccharide material (that, e.g., in a dry state, absorbs and retains a weight amount of water equal to or greater than its own weight), an acrylate such as poly 2-hydroxyethylacrylate and polyalkyl acrylates, an acrylamide such as polyacrylamides, poly methacrylamides, poly vinylpyrrolidone, and poly vinyl acetate. In one embodiment, the superabsorbent polymer particles is a copolymer of acrylamide with, for example, maleic anhydride, vinyl acetate, ethylene oxide, ethylene glycol, acrylonitrile, or a combination thereof. Production of superabsorbent polymer particles are, e.g., from acrylamide (AM) or acrylic acid and its salts. In an embodiment, the superabsorbent polymer particles are polymerized from nonionic, anionic, cationic monomers, or a combination thereof. Polymerization to form the superabsorbent polymer particles can be via free-radical polymerization, solution polymerization, gel polymerization, emulsion polymerization, dispersion polymerization, or suspension polymerization. Moreover, polymerization can be performed in an aqueous phase, in inverse emulsion, or in inverse suspension. Examples of nonionic monomers for making the superabsorbent polymer particles include nonionic monomers such as acrylamide, methacrylamide, N,N-di($C_1$-$C_8$ alkyl)acrylamide such as N,N-dimethylacrylamide, vinyl alcohol, vinyl acetate, allyl alcohol, hydroxyethyl methacrylate, acrylonitrile, and derivatives thereof. Such derivatives include, for example, acrylamide derivatives, specifically alkyl-substituted acrylamides or aminoalkyl-substituted derivatives of acrylamide or methacrylamide, and are more specifically acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide, N-tert-butylacrylamide, N-vinylformamide, N-vinylacetamide, acrylonitrile, methacrylonitrile, or a combination thereof. Examples of anionic monomers for making the superabsorbent polymer particles include ethylenically unsaturated anionic monomers containing acidic groups including a carboxylic group, a sulfonic group, a phosphonic group, a salt thereof, a derivative thereof, or a combination thereof. In an embodiment, the anionic monomer is acrylic acid, methacrylic acid, ethacrylic acid, maleic acid, maleic anhydride, fumaric acid, itaconic acid, α-chloroacrylic acid, β-cyanoacrylic acid, β-methylacrylic acid (crotonic acid), α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, or a combination thereof. Examples of cationic monomers for making the superabsorbent polymer particles include an N,N-di-$C_1$-$C_8$ alkylamino-$C_1$-$C_8$ alkylacrylate (e.g., N,N-dimethyl amino ethyl acrylate), N,N-di-$C_1$-$C_8$ alkylamino-$C_1$-$C_8$ alkylmethacrylate (e.g., N,N-dimethyl amino ethyl methacrylate), including a quaternary form (e.g., methyl chloride quaternary forms), diallyldimethyl ammonium chloride, N,N-di-$C_1$-$C_8$ alkylamino-$C_1$-$C_8$ alkylacrylamide, and a quaternary form thereof such as acrylamidopropyl trimethyl ammonium chloride.

In an embodiment, the superabsorbent polymer particles is an amphoteric superabsorbent polymer particles, containing both cationic substituents and anionic substituents. The cationic substituents and anionic substituents occur in various stoichiometric proportions, including one-to-one, or one substituent is present in a greater stoichiometric amount than the other substituent. Representative amphoteric superabsorbent polymer particles include terpolymers of nonionic monomers, anionic monomers and cationic monomers.

In a preferred embodiment, the superabsorbent polymer includes repeating units comprises an acrylate, an acrylamide, a vinylpyrrolidone, a vinyl acetate, a vinyl alcohol, a saccharide, a 2-acrylamide-2-methylpropanesulfonic acid, a derivative thereof, or combinations thereof.

In an embodiment, the superabsorbent polymer particles is a guar gum or carrageenan. Suitable materials include those disclosed in Japanese Patent Application No. P2003-154262A, the content of which is incorporated by reference herein in its entirety.

Such superabsorbent polymers ('SAP") and proppants disposed therein are set forth in U.S. patent application Ser. No. 13/888,457, filed on May 7, 2013, herein incorporated by reference. For instance, the SAP is polyacrylamide having crosslinks that are polyethylene glycol diacrylate. In some embodiments, the SAP is polyacrylic acid, wherein the crosslinks are vinyl ester oligomer. In an embodiment, the SAP is poly(acrylic acid) partial sodium salt graft poly (ethylene glycol).

Further, along with the SAP, the fluid can contain a breaker. The breaker contacts the SAP to break the SAP. In an embodiment, the breaker contacts the SAP and breaks a bond in the backbone of the polymer chains of the SAP, a bond in the crosslinker, a bond between the crosslinker and a polymer chain of the SAP, or a combination thereof. That is, breaking the SAP includes disintegrating, decomposing, or dissociating the SAP such as by breaking bonds in the backbone of the SAP, breaking crosslinks among chains of the SAP, changing a geometrical conformation of the superabsorbent polymer, or a combination thereof. In this way, the viscosity of the hydraulic fracturing composition decreases. In some embodiments, the breaker breaks the SAP to form a decomposed polymer such as a plurality of fragments that have a lower molecular weight than the SAP. After breaking the SAP, the plurality of proppant particles is released from the SAP.

According to an embodiment, the breaker includes an oxidizer such as a peroxide, a persulfate, a perphosphate, a perborate, a percarbonate, a persilicate, anoxyacid of a halogen, an oxyanion of halogen, a peracid, a derivative thereof, or a combination thereof.

In one embodiment, the breaker is persulfate, such as sodium persulfate, ammonium persulfate, potassium persulfate, potassium peroxymonosulfate (Caro's acid), or a combination thereof. The breaker is, e.g., an oxyacid or oxyanion of halogen, for instance, hypochlorous acid, a hypochlorite, chlorous acid and chlorites, chloric acid and chlorates, perchloric acid and perchlorate, a derivative thereof, or a combination thereof.

In an embodiment, a peroxide breaker has oxygen-oxygen single bonds in its molecular structure. The peroxide breaker is hydrogen peroxide or another material to provide peroxide or hydrogen peroxide for breaking the SAP. Metal peroxides such as sodium peroxide, calcium peroxide, zinc peroxide, magnesium peroxide, or other peroxides such as superoxides, organic peroxides, and the like can be used.

Additionally, in an embodiment, the peroxide breaker is a stabilized peroxide breaker with the hydrogen peroxide bound, inhibited, or the like by another compound or molecule prior to contact with, e.g., an aqueous fluid such as water such that it forms or releases hydrogen peroxide when contacted by the aqueous fluid. Exemplary stabilized peroxide breakers include an adduct of hydrogen peroxide with another molecule and include carbamide peroxide or urea peroxide (C(=O)(NH2)$_2$.H$_2$O$_2$), a percarbonate (e.g., sodium percarbonate (2Na$_2$CO$_3$.3H$_2$O$_2$), potassium percarbonate, ammonium percarbonate, and the like), and the like. The stabilized peroxide breakers also include compounds that undergo hydrolysis in water to release hydrogen peroxide, e.g., sodium perborate. In an embodiment, hydrogen peroxide stabilized with appropriate surfactants also is used as the stabilized peroxide breaker.

According to an embodiment, the breaker is the peracid, e.g., peracetic acid, perbenzoic acid, a derivative thereof, or a combination thereof. Additionally, a variety of peroxycarboxylic acids is employed as the peracid breaker. The peroxycarboxylic acid includes an ester peroxycarboxylic acid, an alkyl ester peroxycarboxylic acid, a sulfoperoxycarboxylic acid, or a combination thereof. Peroxycarboxylic acid (or percarboxylic acid) are acids having a general formula $R(CO_3H)_n$. In an embodiment, the R group is saturated or unsaturated as well as substituted or unsubstituted. As described herein, R is an alkyl, alkenyl, arylalkyl, arylalkenyl, cycloalkyl, cycloalkenyl, aromatic, heterocyclic, or ester group, or a combination thereof (e.g., an alkyl ester group), with n being 1, 2, or 3. Exemplary ester groups include aliphatic ester groups, such as $R^1OC(O)R^2$, where $R^1$ and $R^2$ independently are a group (e.g., an alkyl group) described above for R such that $R^1$ and $R^2$ are, e.g., independently small carbon chain alkyl groups, such as a $C_1$-$C_5$ alkyl group.

One skilled in the art will appreciate that peroxycarboxylic acids may not be as stable as carboxylic acids, and their stability may increase with increasing molecular weight. Thermal decomposition of the peracids proceed by, e.g., free radical and nonradical paths, by photodecomposition or radical-induced decomposition, or by the action of metal ions or complexes. In an embodiment, the percarboxylic acid peracids are made by direct, acid catalyzed equilibrium action of hydrogen peroxide with a carboxylic acid, by autoxidation of aldehydes, or from acid chlorides, and hydrides, or carboxylic anhydrides with hydrogen or sodium peroxide.

Exemplary peroxycarboxylic acids include peroxyformic, peroxyacetic, peroxypropionic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxycitric, peroxymaleic, peroxyascorbic, peroxyhydroxyacetic (peroxyglycolic), peroxyoxalic, peroxymalonic, peroxysuccinic, peroxyglutaric, peroxyadipic, peroxypimelic, peroxysuberic, peroxysebacic acid, and the like.

In an embodiment, the peracid includes a combination of several peroxycarboxylic acids. According to one embodiment, the composition includes a $C_2$-$C_4$ peroxycarboxylic acid, a $C_8$-$C_{12}$ peroxycarboxylic acid, an ester peroxycarboxylic acid, an alkyl ester peroxycarboxylic acids, or a mono- or di-peroxycarboxylic acid having up to 12 carbon atoms, and more specifically 2 to 12 carbon atoms. In an embodiment, the peroxycarboxylic acid includes peroxyacetic acid (POAA) (i.e., peracetic acid having the formula $CH_3COOOH$) or peroxyoctanoic acid (POOA) (i.e., peroctanoic acid having the formula, e.g., of n-peroxyoctanoic acid: $CH_3(CH_2)_6COOOH$).

In an embodiment, the peracid is an ester peroxycarboxylic acid. As used herein, ester peroxycarboxylic acid refers to a molecule having the formula:

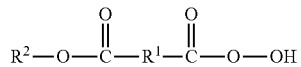

wherein $R^1$ and $R^2$ are independently an organic group (e.g., alkyl, linear or cyclic, aromatic or saturated) or a substituted organic group (e.g., with a heteroatom or organic group). In an embodiment, the ester peroxycarboxylic acid is made by employing methods used for making peroxycarboxylic acid such as combining the corresponding ester carboxylic acid with an oxidizing agent, e.g., hydrogen peroxide.

Exemplary alkyl esterperoxycarboxylic acids include monomethyl monoperoxyglutaric acid, monomethyl monoperoxyadipic acid, monomethyl monoperoxyoxalic acid, monomethyl monoperoxymalonic acid, monomethyl monoperoxysuccinic acid, monomethyl monoperoxypimelic acid, monomethyl monoperoxysuberic acid, and monomethyl monoperoxysebacic acid; mono ethyl monoperoxyoxalic acid, monoethyl monoperoxymalonic acid, monoethyl monoperoxysuccinic acid, monoethyl monoperoxyglutaric acid, monoethyl monoperoxyadipic acid, monoethyl monoperoxypimelic acid, monoethyl monoperoxysuberic acid, and monoethyl monoperoxysebacic acid; monopropyl monoperoxyoxalic acid, monopropyl monoperoxymalonic acid, monopropyl monoperoxysuccinic acid, monopropyl monoperoxyglutaric acid, monopropyl monoperoxyadipic acid, monopropyl monoperoxypimelic acid, monopropyl monoperoxysuberic acid, monopropyl monoperoxysebacic acid, in which propyl is n- or isopropyl; monobutyl monoperoxyoxalic acid, monobutyl monoperoxymalonic acid, monobutyl monoperoxysuccinic acid, monobutyl monoperoxyglutaric acid, monobutyl monoperoxyadipic acid, monobutyl monoperoxypimelic acid, monobutyl monoperoxysuberic acid, monobutyl monoperoxysebacic acid, in which butyl is n-, iso-, or t-butyl; and the like.

In some embodiments, the peracid breaker is a sulfoperoxycarboxylic acid. Sulfoperoxycarboxylic acids, which also are referred to as sulfonated peracids, include the peroxycarboxylic acid form of a sulfonated carboxylic acid. In some embodiments, the sulfonated peracid is a mid-chain sulfonated peracid, i.e., a peracid that includes a sulfonate group attached to a carbon that is at least one carbon (e.g., at least the three position) from the carbon of the percarboxylic acid group in the carbon backbone of the percarboxylic acid chain, wherein the at least one carbon is not in the terminal position. As used herein, the term "terminal position" refers to the carbon on the carbon backbone chain of a percarboxylic acid that is furthest from the percarboxyl group. Thus, in an embodiment, sulfoperoxycarboxylic acid has the following formula:

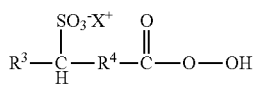

wherein $R^3$ is hydrogen or a substituted or unsubstituted alkyl group; $R^4$ is a substituted or unsubstituted alkyl group; X is hydrogen, a cationic group, or an ester forming moiety; or salts or esters thereof.

In some embodiments, $R^3$ is a substituted or unsubstituted $C_m$ alkyl group; X is hydrogen, a cationic group, or an ester forming moiety; $R^4$ is a substituted or unsubstituted $C_n$ alkyl group; m=1 to 10; n=1 to 10; and m+n is less than 18; or salts, esters, or a combination thereof. In some embodiments, $R^3$ is hydrogen. In other embodiments, $R^3$ is a substituted or unsubstituted alkyl group. In some embodiments, $R^3$ is a substituted or unsubstituted alkyl group that does not include a cycloalkyl group. In some embodiments, $R^3$ is a substituted alkyl group. In some embodiments, $R^3$ is an unsubstituted $C_1$-$C_9$ alkyl group. In some embodiments, $R^3$ is an unsubstituted $C_7$ or $C_8$ alkyl. In other embodiments, $R^3$ is a substituted $C_8$-$C_{10}$ alkyl group. In some embodiments, $R^3$ is a substituted $C_8$-$C_{10}$ alkyl group and is substituted with at least 1, or at least 2 hydroxyl groups. In still yet other embodiments, $R^3$ is a substituted $C_1$-$C_9$ alkyl group. In some embodiments, $R^3_1$ is a substituted $C_1$-$C_9$ substituted alkyl group and is substituted with an —$SO_3H$ group. In other embodiments, $R^3$ is a $C_9$-$C_{10}$ substituted alkyl group. In some embodiments, $R^3$ is a substituted $C_9$-$C_{10}$ alkyl group wherein at least two of the carbons on the carbon backbone form a heterocyclic group. In some embodiments, the heterocyclic group is an epoxide group.

In an embodiment, $R^4$ is a substituted $C_1$-$C_{10}$ alkyl group. In some embodiments, $R^4$ is a substituted $C_8$-$C_{10}$ alkyl. In some embodiments, $R^4$ is an unsubstituted $C_6$-$C_9$ alkyl. In other embodiments, $R^4$ is a $C_8$-$C_{10}$ alkyl group substituted with at least one hydroxyl group. In some embodiments, $R^4$ is a $C_{10}$ alkyl group substituted with at least two hydroxyl groups. In other embodiments, $R^4$ is a $C_8$ alkyl group substituted with at least one —$SO_3H$ group. In some embodiments, $R^4$ is a substituted $C_9$ group, wherein at least two of the carbons on the carbon backbone form a heterocyclic group. In some embodiments, the heterocyclic group is an epoxide group. In some, embodiments, $R^4$ is a $C_8$-$C_9$ substituted or unsubstituted alkyl, and $R^4$ is a $C_7$-$C_8$ substituted or unsubstituted alkyl.

According to an embodiment, in the hydraulic fracturing composition, the breaker is encapsulated in an encapsulating material to prevent the breaker from contacting the SAP. The encapsulating material is configured to release the breaker in response to the breaking condition. The breaker is a solid or liquid. As a solid, the breaker is, e.g., a crystalline or granular material. In an embodiment, the solid is encapsulated or provided with a coating to delay its release or contact with the SAP. Encapsulating materials are the same or different as the coating material noted above with regard to the proppant particles. Methods of disposing the encapsulating material on the breaker are the same or different as for disposing the coating on the proppant particles. In an embodiment, a liquid breaker is dissolved in an aqueous solution or another suitable solvent.

In an embodiment, the encapsulation material is a polymer that releases the breaker in a controllable way, e.g., at a controlled rate or concentration. Such material is a polymer that degrades over a period of time to release the breaker and is chosen depending on the release rate desired. Degradation of the polymer of the encapsulation material polymer occurs, e.g., by hydrolysis, solvolysis, melting, and the like. In an embodiment, the polymer of the encapsulation material is a homopolymer or copolymer of glycolate and lactate, a polycarbonate, a polyanhydride, a polyorthoester, a polyphosphacene, or a combination thereof.

According to an embodiment, the encapsulated breaker is an encapsulated hydrogen peroxide, encapsulated metal peroxides (e.g., sodium peroxide, calcium peroxide, zinc peroxide, and the like) or any of the peracids or other breaker herein.

In an embodiment of the disclosure a mixture of proppants of varying density may be used in the fluid laden with proppant. For instance, a mixture of any of the proppants referred to herein, may be used. As an example, a mixture of an ultra lightweight proppant and a proppant, such as sand, having an ASG in excess of 2.65 may be used.

Vertical pillars created by the method disclosed herein may extend continuously or non-continuously within the fracture. For instance, the vertical pillars may extend continuously from near the top to the bottom of the fracture, thereby creating a circuitous route for produced fluids to progress to the wellbore.

The use of proppants within the fluid laden of mixed density is often desirable since they will separate within the fluid leaving an open conduit for fluid flow down the center of the fracture between discontinuous pillars.

A fluid laden with proppant may contain a mixture of proppants of varying density and the fluid substantially free of proppant may contain only that amount of proppant to establish a partial monolayer of proppant within the formation. The proppant in the substantially proppant free fluid may be a mixture of proppants as discussed herein or may contain a conventional proppant having an ASG greater than or equal to 2.65 or a proppant having an ASG less than 2.65, such as an ultra lightweight proppant.

The stability of pillars in low to ultra low permeability formations where fracture closure times are lengthy may be maintained by the use of ultra lightweight proppants as well as deformable proppants and combination of deformable proppants and conventional proppants (proppants having an ASG greater than 2.45), non-spherical proppants, such as those disclosed in U.S. Pat. No. 7,950,455, herein incorporated by reference, combinations of nonspherical proppants with spherical proppants as well as the resin coated proppants which set quickly. Combinations of any of the proppants disclosed herein may also be used.

The proppant may further be disposed in a pillar stabilizing agent. Such pillar stabilizing agents may be degradable. Such stabilizing agents typically contain a cationic species especially those having a radius of hydration less than that of the sodium ion of the clay of the formation. Such stabilizers diminish the disintegration of formation clays and inhibit swelling of the clay. Such stabilizers may include potassium chloride, quaternary amine polyelectrolyte as well as ionic liquids. Suitable ionic liquids are composed of at least one cation and at least one anion. The cation may be an imidazolium of the formula (I):

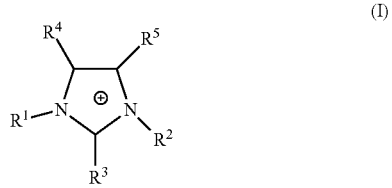

wherein $R^1$ and $R^2$ are independently a $C_1$-$C_6$ alkyl group or a $C_1$-$C_6$ alkoxyalkyl group and $R^3$, $R^4$ and $R^5$ are independently may be —H, a $C_1$-$C_6$ alkyl, a $C_1$-$C_6$ alkoxyalkyl group or a $C_1$-$C_6$ alkoxy group.

Alternatively, the cation may be a quaternary ammonium, such as those of formula (II):

$$N(R^6)(R^7)(R^8)(R^9) \quad (II)$$

wherein $R^6$, $R^7$, $R^8$ and $R^9$ are independently a $C_1$-$C_6$ alkyl group or a hydroxyalkyl group wherein the alkyl group is preferably a $C_1$-$C_6$ alkyl. Preferably, each $R^6$, $R^7$ and $R^8$ is a hydroxyalkyl, such as 2-hydroxyethyl, and $R^9$ is an alkyl group, such as methyl. In another preferred embodiment, each of $R^6$, $R^7$, $R^8$ and $R^9$ are an alkyl group.

The anion of the ionic liquid is preferably a halide, X, perchlorate, thiocyanate, cyanate, a $C_1$-$C_6$ carboxylate, an alkyl sulfate, methanesulfonate, $BX_4^-$, $PF_6^-$, $AsF_6^-$, $SbF_6^-$, $NO_2^-$, $NO_3^-$ or $SO_4^-$, where X is a halide.

Preferred ionic liquids include 1-ethyl-3-methylimidazolium chloride, tris-(2-hydroxyethyl)-methylammonium methylsulfate, methyl tri-n-butyl ammonium methylsulfate, 1-ethyl-3-methylimidazolium methanesulfonate, 1-butyl-3-methylimidazolium chloride, 1-butyl-3-methylimidazolium methanesulfonate, 1-ethyl-2,3-di-methylimidazolium ethylsulfate and 1,2,3-trimethyl-imidazolium methylsulfate. Especially preferred are 1-ethyl-3-methylimidazolium chloride, methyl-tri-n-butylammonium methylsulfate and tris-(2-hydroxyethyl)-methylammonium methylsulfate.

Stabilizers receptive to high temperatures, such as phenothiazine, alkaline earth metals selected from magnesium, calcium, strontium, barium and mixtures thereof, and alkali metals selected from lithium, sodium, potassium and mixtures thereof, may be used. Preferred stabilizers include MgO, $TiO_2$, $Al_2O_3$ and mixtures thereof as well as sodium salicylate and silanes.

The fluid laden with proppant as well as the sweep fluid may also contain other conventional additives common to the well service industry such as surfactants, biocides, gelling agents, solvents, foaming agents, demulsifiers, buffers, acids, or mixtures thereof.

All percentages set forth in the Examples are given in terms of weight units except as may otherwise be indicated.

EXAMPLES

Comparative Example 1

A fracturing treatment was conducted for a Marcellus shale formation having a depth to middle perforation of 14,973 ft; a bottom hole static temperature of approximately 222° F., a bottom hole fracture pressure of approximately 8,580 psi; an average surface treating pressure of approximately 7,700 psi; and a fracture gradient of about 0.70 psi/ft. The casing had an outer diameter of 5.5', an inner diameter of 4.8 inches.

A 30 lb. borate crosslinked guar fluid (BCGF) was used as the fracturing fluid. The fluid may contain 100% white sand of 30/50 mesh. The desired result was a partial monolayer distribution of proppant upon fracture closure. The estimated liquid proppant concentration was estimated to be approximately 4 pounds of proppant added per gallon of liquid (ppa). This represents the estimated concentration of proppant needed to accommodate the flow rates of the pumps. The fracturing treatment required approximately 437,500 pounds of proppant.

In the first stages, the fluid was slickwater, an acidic fluid or a linear gel. The fluid was pumped into the formation at a slurry rate of about 72 barrels per minute (bpm). The rate of proppant pumped into the formation averaged about 6,540 lbs/min. The proppant fluid approximates the number of pounds of proppant required to effectuate the desired downhole concentration of proppant. Each stage was conducted for about 1 minute followed by a shut-down of about 5 minutes. The average slurry hydraulic horsepower during the operation was about 13,600 psi. The amount of proppant between stages was varied up to 1 lb per stage. The treatment stages are illustrated in Table II:

TABLE II

| Stage | Type Fluid | Fluid Volume (gal) | Est. Liquid Downhole Proppant Conc. (ppa) | Proppant Type | Proppant Stage (lbs) | Proppant Cum (lbs) |
|---|---|---|---|---|---|---|
| 1 | Slickwater | 1,000 | 0 | | | |
| 2 | 15% HCl | 2,000 | 0 | | | |
| 3 | Slickwater | 9,000 | 0 | | | |
| 4 | Linear Gel | 2,000 | 0 | | | |
| 5 | BCGF | 38,000 | 0 | | | |
| 6 | BCGF | 2,000 | 0.5 | Sand | 1,000 | 1,000 |
| 7 | BCGF | 38,000 | | | | 1,000 |
| 8 | BCGF | 20,000 | 1.0 | Sand | 2,000 | 21,000 |
| 9 | BCGF | 31,000 | 1.5 | Sand | 46,500 | 67,500 |
| 10 | BCGF | 49,000 | 2.0 | Sand | 98,000 | 165,500 |
| 11 | BCGF | 50,000 | 3.0 | Sand | 150,000 | 315,500 |
| 12 | BCGF | 18,000 | 4.0 | Sand | 72,000 | 387,500 |
| 13 | BCGF | 12,500 | 4.0 | Resin coated sand | 50,000 | 437,500 |
| 14 | Slickwater | 10,200 | 0.00 | | | 437,500 |
| Total | | 282,700 | | | | 437,500 |

Figure 2:
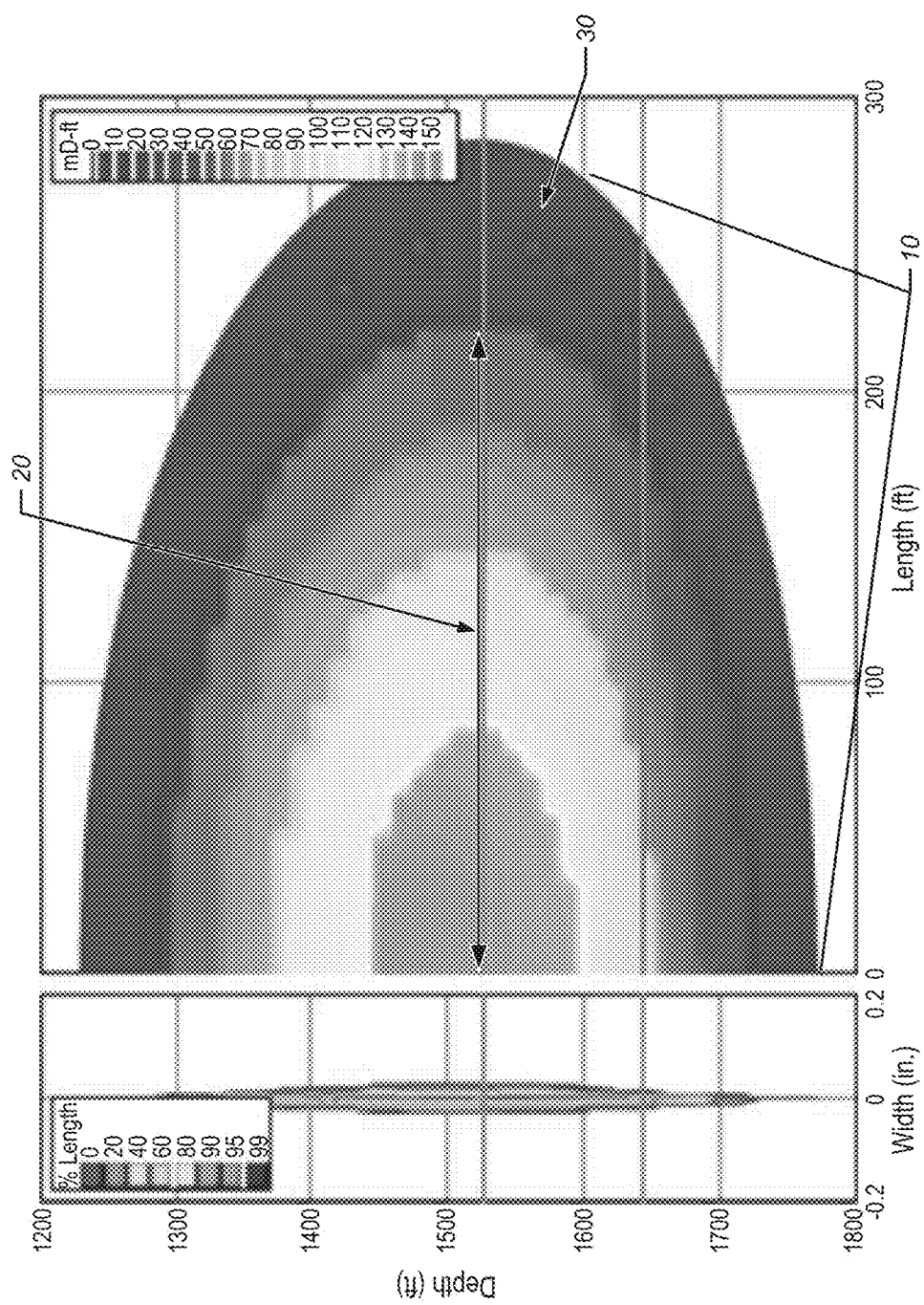
FIG. 2 depicts a fracture, after closure, using conventional fracturing methods where successive proppant stages of a fracturing fluid comprising borate crosslinked derivatized guar are pumped into a subterranean formation.
Figure 3:
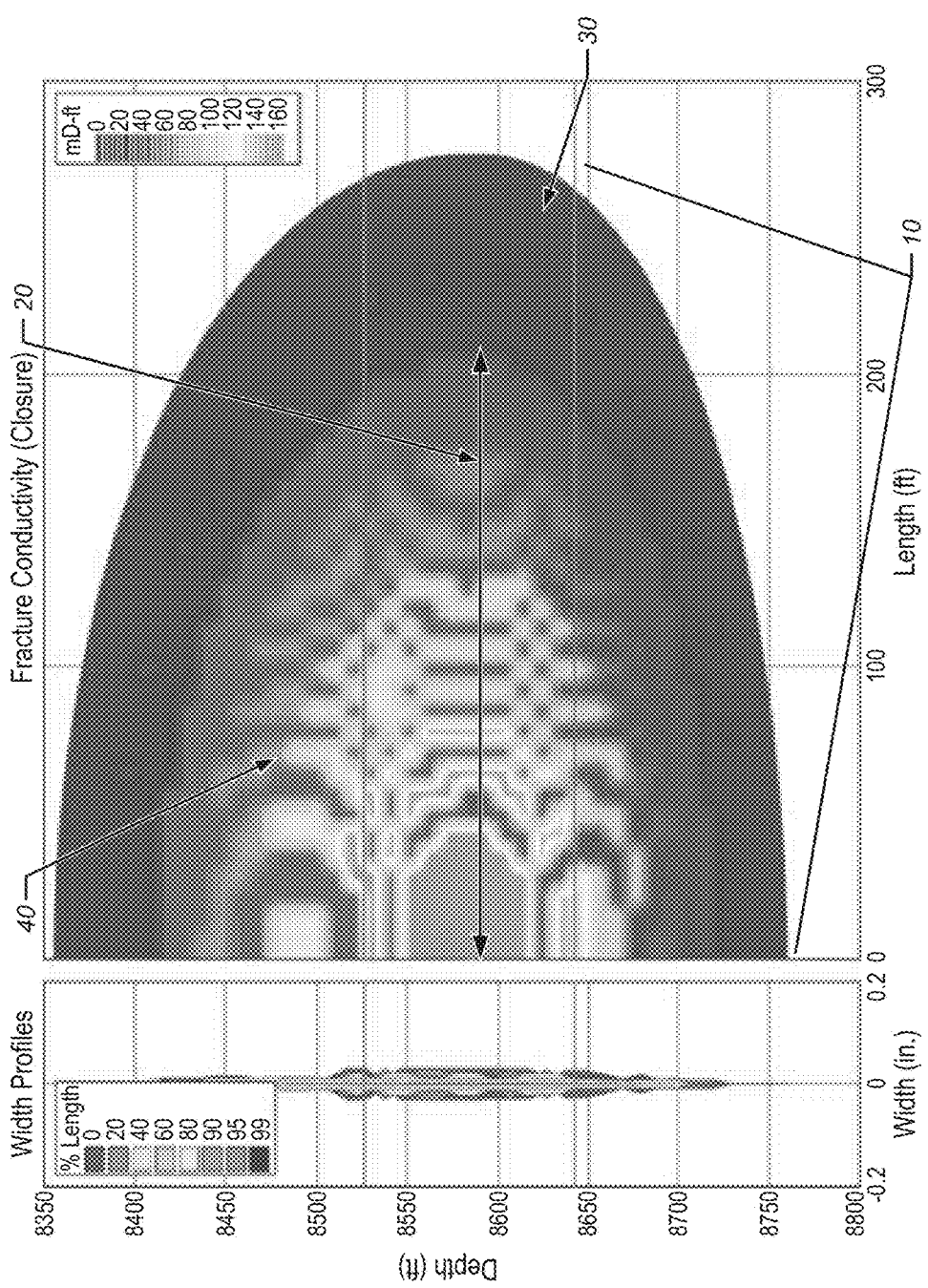
FIG. 3 depicts a fracture, after closure, using the method disclosed wherein the fracturing fluid comprises borate crosslinked derivatized guar.
Figure 4:
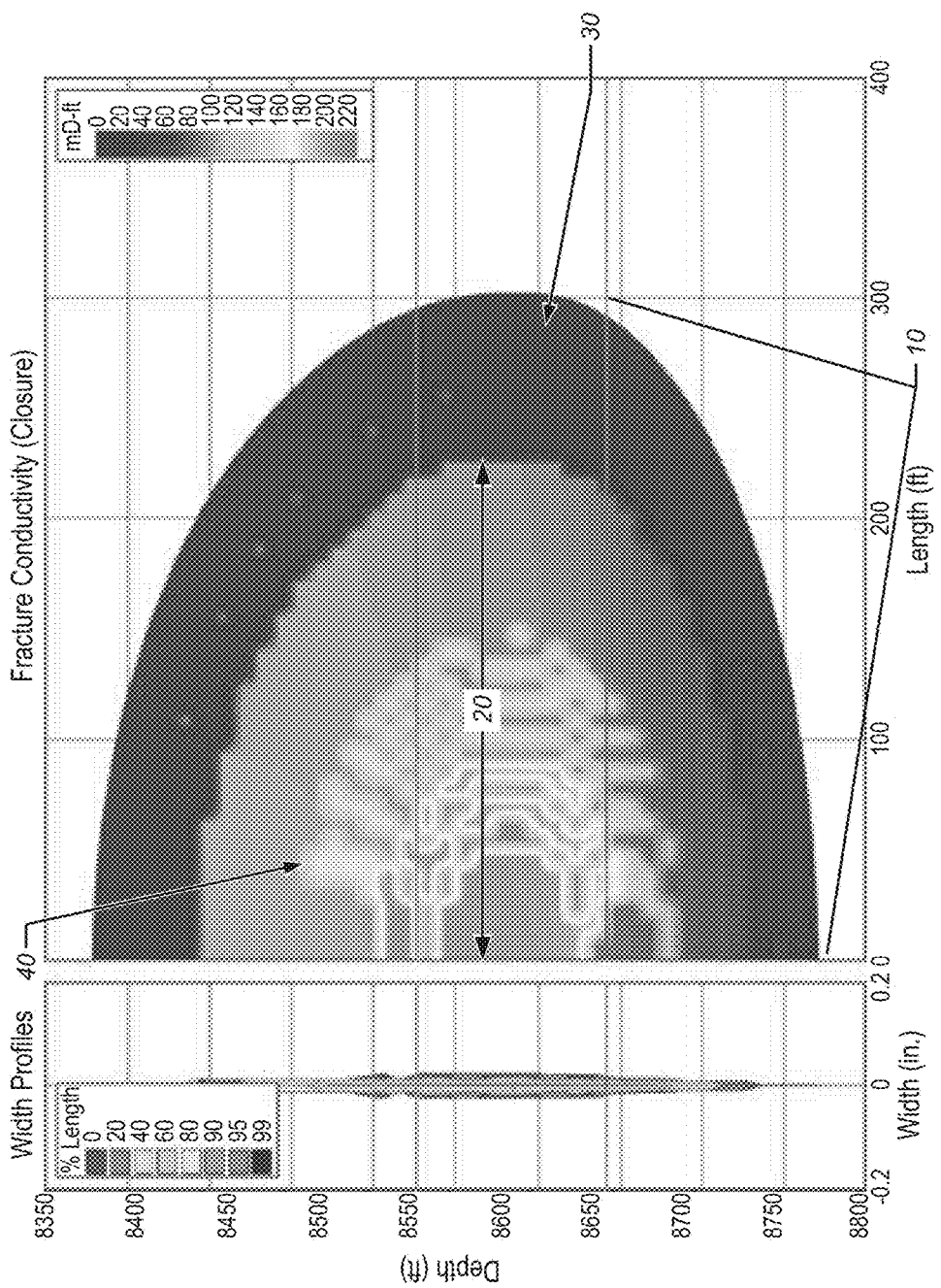
FIG. 4 depicts a fracture, after closure, using the method disclosed wherein the fracturing fluid is a crosslinked fluid comprising a zwitterionic polymer of a betaine and surfactant.
Figure 5:
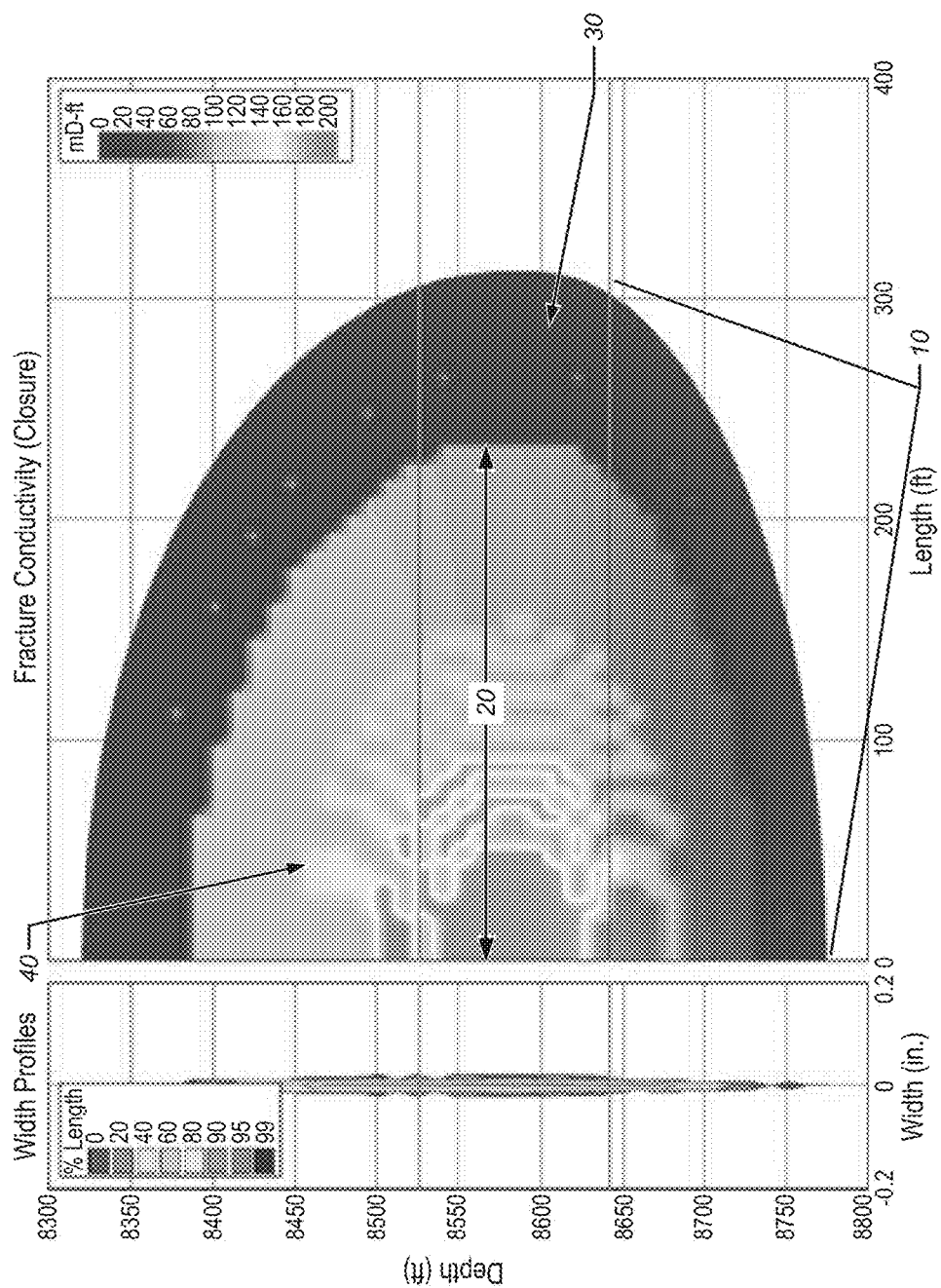
FIG. 5 depicts a fracture, after closure, using the method disclosed wherein the fracturing fluid comprises an anionic surfactant and a cationic surfactant.
Figure 6:
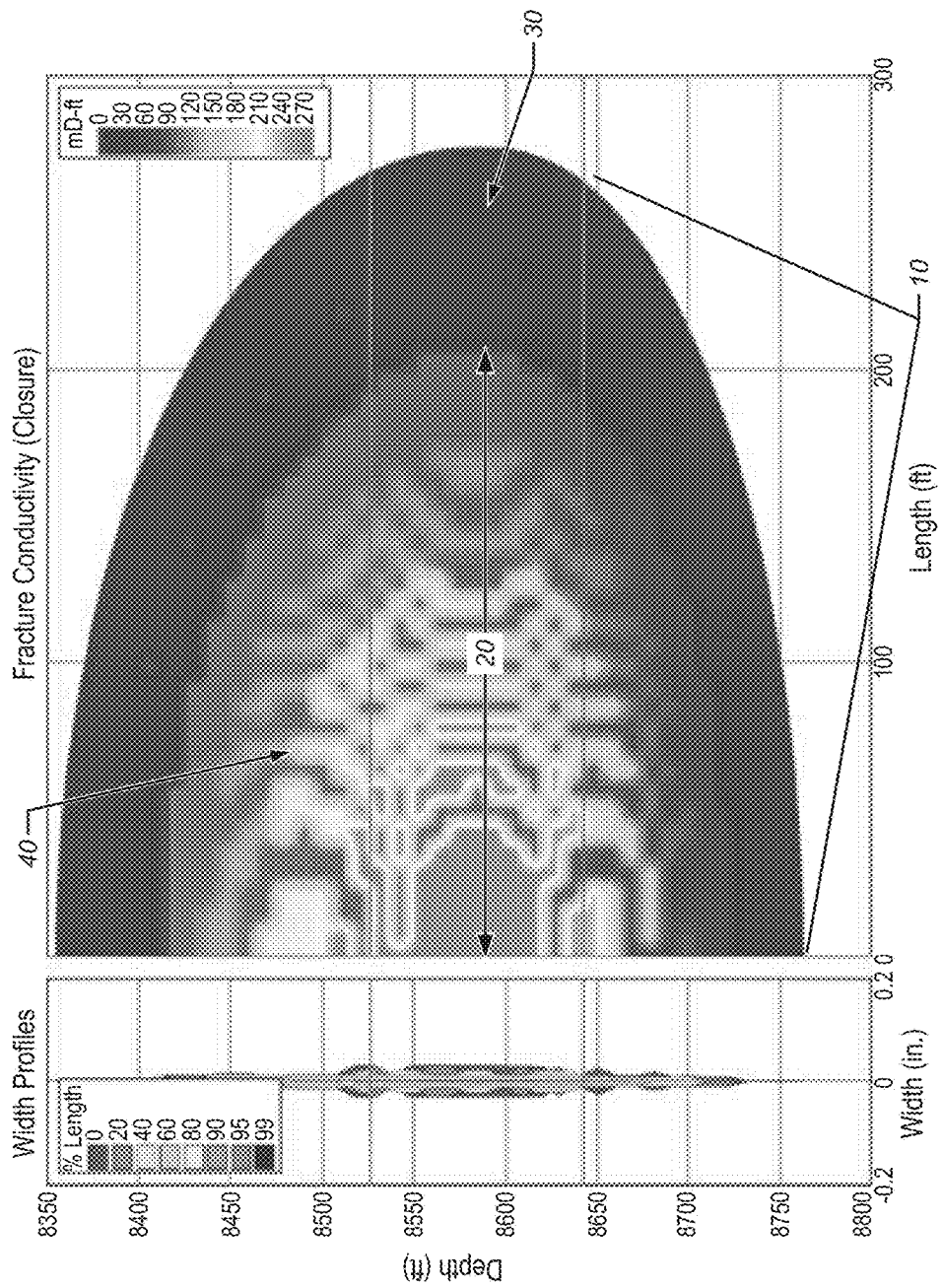
FIG. 6 depicts a fracture, after closure, using the method disclosed wherein the fracturing fluid comprises carboxymethyl cellulose crosslinked with a zirconium crosslinking agent.
Figure 7:
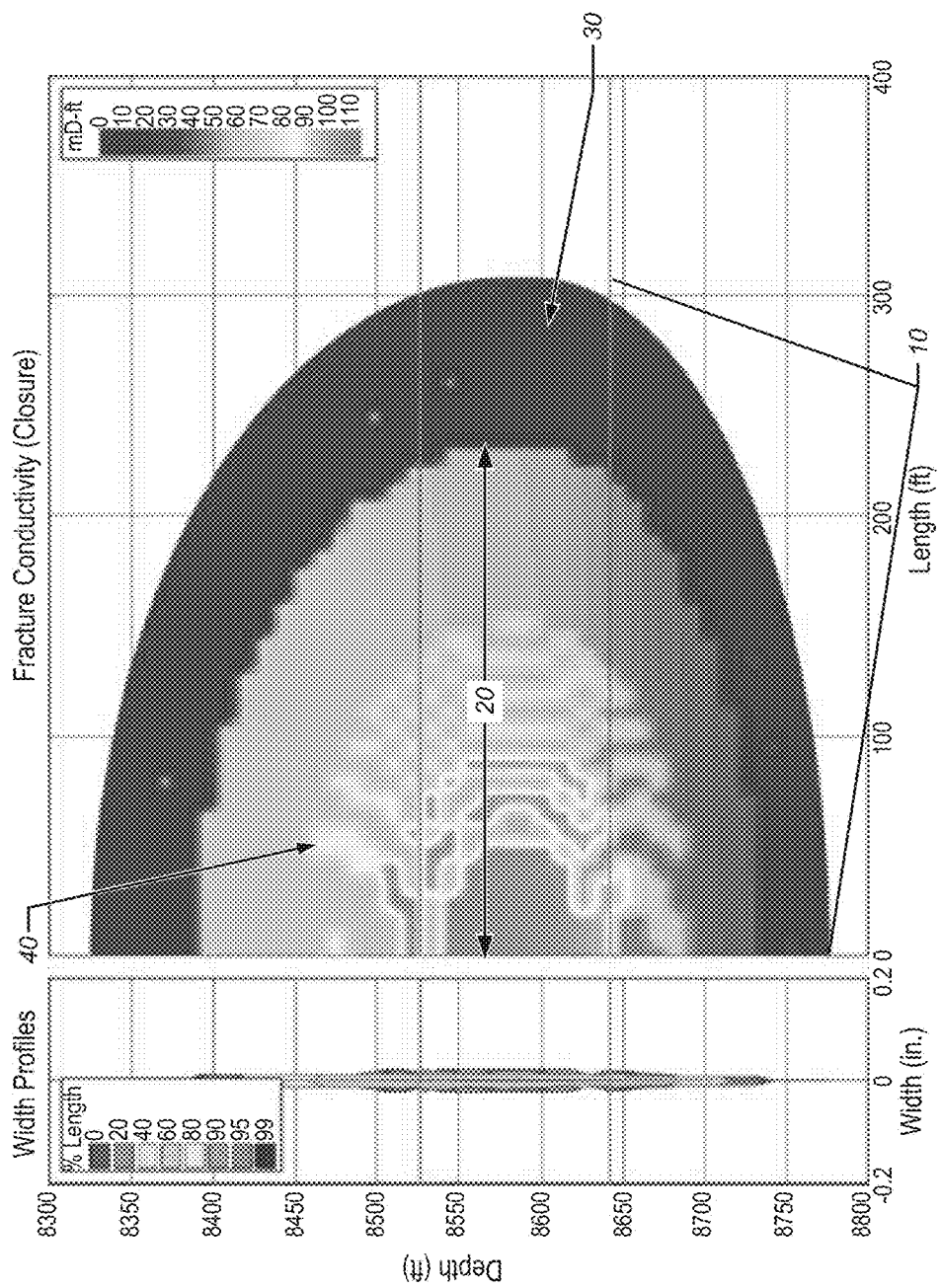
FIG. 7 depicts a fracture, after closure, using the method disclosed wherein the fracturing fluid comprises a borate crosslinked underivatized guar.

Fracture conductivity between the proppant-packed fracture and that of the native reservoir, mathematically defined as:

(proppant pack permeability x fracture width)/(formation permeability x propped fracture half length)

is illustrated in the conductivity profile of FIG. 2 after closure of the fracture. The "created fracture area," represented as 10, is the area of the reservoir traversed by the propagating fracturing fluid pad. The "propped fracture area", 20, is contributory to well stimulation, and represents the area of the reservoir "propped open" to provide improved fracture conductivity. The created but unpropped area 30, "heal" upon fracture closure and, thus, is not considered to be stimulated.

Examples 2-6

A fracturing treatment using the reservoir properties of Comparative Example 1 was followed for a Marcellus shale formation. The density and concentrations of the Sweep fluid and the fluid containing the proppant in this Example and Comparative Example 1 were the same. A fracture was simulated using the Mfrac three-dimensional hydraulic fracturing simulator of Meyer & Associates, Inc. using a simple 3-layer isotropic homogeneous 0.1 mD permeability gas reservoir model, 40 acre spacing. The fracture was designed to be placed into the zone at a theoretical depth of 15,000 feet and the model was run in full 3-D mode. The desired result was the creation of a proppant pillars and conductive channels between the proppant pillars upon fracture closure. It was determined that the fracturing treatment would require approximately 179,830 pounds of proppant. The pumped slurry rate was about 72 barrels per minute (bpm). The rate of proppant pumped into the formation averaged about 6,540 lbs/min. Each stage was conducted for about 1 minute followed by a shut-down of about 5 minutes. The fracturing fluid (FF) was BCGF (Example 2), a fluid composed of a zwitterionic polymer of a betaine and surfactant, as set forth in U.S. Pat. No. 8,183,181 (Example 3), a fluid comprising an anionic surfactant and a cationic surfactant, as set forth in U.S. Pat. No. 6,468,945 (Example 4), a fluid comprising carboxymethyl cellulose crosslinked with a zirconium crosslinking agent (Example 5) and a fluid comprising a borate crosslinked underivatized guar (Example 6). The average slurry hydraulic horsepower during the operation was about 13,600 psi. Table III shows the pump schedule:

TABLE III

| | Fluid | | Proppant | | |
|---|---|---|---|---|---|
| Stage | Type | Volume (gal) | Conc. (ppa) | Type | Stage (lbs) | Cum (lbs) |
| 1 | Slickwater | 1000 | | | | |
| 2 | 15% HCl Acid | 2000 | | | | |
| 3 | Slickwater | 9000 | | | | |
| 4 | 30# Linear Gel | 2000 | | | | |
| 5 | FF | 26600 | | | | |
| 6 | FF | 1400 | 0.5 | 100% Sand, White 30/50 | 700 | 700 |
| 7 | FF | 26600 | | | | 700 |
| 8 | FF | 2100 | 1 | 100% Sand, White 30/50 | 2100 | 2800 |
| 9 | FF | 2100 | 0.1 | Sweep | 210 | 3010 |
| 10 | FF | 2100 | 1 | 100% Sand, White 30/50 | 2100 | 5110 |
| 11 | FF | 2100 | 0.1 | Sweep | 210 | 5320 |
| 12 | FF | 2100 | 1 | 100% Sand, White 30/50 | 2100 | 7420 |
| 13 | FF | 2100 | 0.1 | Sweep | 210 | 7630 |
| 14 | FF | 2100 | 1.5 | 100% Sand, White 30/50 | 3150 | 10780 |
| 15 | FF | 2100 | 0.1 | Sweep | 210 | 10990 |
| 16 | FF | 2100 | 1.5 | 100% Sand, White 30/50 | 3150 | 14140 |
| 17 | FF | 2100 | 0.1 | Sweep | 210 | 14350 |
| 18 | FF | 2100 | 1.5 | 100% Sand, White 30/50 | 3150 | 17500 |
| 19 | FF | 2100 | 0.1 | Sweep | 210 | 17710 |
| 20 | FF | 2100 | 1.5 | 100% Sand, White 30/50 | 3150 | 20860 |
| 21 | FF | 2100 | 0.1 | Sweep | 210 | 21070 |
| 22 | FF | 2100 | 1.5 | 100% Sand, White 30/50 | 3150 | 24220 |
| 23 | FF | 2100 | 0.1 | Sweep | 210 | 24430 |
| 24 | FF | 4200 | 2 | 100% Sand, White 30/50 | 8400 | 32830 |
| 25 | FF | 4200 | 0.1 | Sweep | 420 | 33250 |
| 26 | FF | 4200 | 2 | 100% Sand, White 30/50 | 8400 | 41650 |
| 27 | FF | 4200 | 0.1 | Sweep | 420 | 42070 |
| 28 | FF | 4200 | 2 | 100% Sand, White 30/50 | 8400 | 50470 |
| 29 | FF | 4200 | 0.1 | Sweep | 420 | 50890 |
| 30 | FF | 4200 | 2 | 100% Sand, White 30/50 | 8400 | 59290 |
| 31 | FF | 4200 | 0.1 | Sweep | 420 | 59710 |
| 32 | FF | 4200 | 3 | 100% Sand, White 30/50 | 12600 | 72310 |
| 33 | FF | 4200 | 0.1 | Sweep | 420 | 72730 |
| 34 | FF | 4200 | 3 | 100% Sand, White 30/50 | 12600 | 85330 |
| 35 | FF | 4200 | 0.1 | Sweep | 420 | 85750 |
| 36 | FF | 4200 | 3 | 100% Sand, White 30/50 | 12600 | 98350 |
| 37 | FF | 4200 | 0.1 | Sweep | 420 | 98770 |
| 38 | FF | 4200 | 3 | 100% Sand, White 30/50 | 12600 | 111370 |
| 39 | FF | 4200 | 0.1 | Sweep | 420 | 111790 |
| 40 | FF | 4200 | 4 | 100% Sand, White 30/50 | 16800 | 128590 |
| 41 | FF | 4200 | 0.1 | Sweep | 420 | 129010 |
| 42 | FF | 4200 | 4 | 100% Sand, White 30/50 | 16800 | 145810 |
| 43 | FF | 4200 | 0.1 | Sweep | 420 | 146230 |
| 44 | FF | 8400 | 4 | 100% Sand, White 30/50 | 33600 | 179830 |
| 45 | Slickwater | 12950 | | Flush | | 179830 |
| | | 207550 | | | | 179830 |

Sweep Fluid is FF containing minimal proppant

The conductivity data for the fracture network is set forth in Table IV which shows that the average fracture permeability with conventional fracturing is about 29 darcies and with the protocol disclosed herein (using less water and less proppant than in conventional fracturing) is from 29 to greater than 52 darcies.

TABLE IV

| | DFN | | | | | | | | |
|---|---|---|---|---|---|---|---|---|---|
| | Fracturing Fluid | | | | | | | | |
| | 2L ft | 2L Propped ft | H ft | Volume Us gal | Area ft² | Propped Area ft² | Avg Frac Conductivity mD-ft | $C_{fd}^1$ | Avg Frac Perm Darcy |
| Comp. Ex. 1 | 10181 | 8085 | 425 | 2.65E+05 | 4.33E+06 | 3.46E+06 | 54.0 | 1640.0 | 29.0 |
| Ex. 2 | 9478 | 7162 | 317 | 1.93E+05 | 3.00E+06 | 2.31E+06 | 49.9 | 1642.5 | 29.0 |
| Ex. 3 | 11417 | 6916 | 347 | 1.90E+05 | 3.95E+06 | 2.43E+06 | 79.2 | 2960.0 | 52.2 |
| Ex. 4 | 12158 | 5453 | 356 | 1.89E+05 | 4.33E+06 | 1.96E+06 | 82.0 | 4001.0 | 52.2 |
| Ex. 5 | 9401 | 7178 | 319 | 1.93E+05 | 3.00E+06 | 2.34E+06 | 89.1 | 2932.0 | 52.2 |
| Ex. 6 | 11746 | 6240 | 353 | 1.90E+05 | 4.15E+06 | 2.24E+06 | 44.5 | 1874 | 29.0 |

[1]Dimensionless fracture conductivity

Fracture conductivity between the proppant-packed fracture and that of the native reservoir is illustrated in the conductivity profile of FIGS. 3, 4, 5, 6 and 7 for the fracturing fluids of Examples 2, 3, 4, 5 and 6, respectively, after closure of the fracture. The "created fracture area," represented as 10, is the area of the reservoir traversed by the propagating fracturing fluid pad. The "propped fracture area", 20, is contributory to well stimulation, and represents the area of the reservoir "propped open" to provide improved fracture conductivity. The created but unpropped area 30, "heal" upon fracture closure and, thus, is not considered to be stimulated. The pillars are represented by striations 40. In contrast to FIG. 2 which illustrates conductivity being maximized in the middle of the propped fracture area, FIGS. 3-7 illustrate expansion of the area of conductivity around the created pillars.

The creation of pillars by the pumping schedule disclosed herein provides greater conductivity in complex fracture networks while using less water and less proppant than in conventional fracturing. For instance, in Comparative Example 1, 437,500 lbs of proppant was used versus 179,830 lbs of proppant in Examples 2-6, representing almost 69% less proppant. The amount of fracturing fluid used in Comparative Example 1 (285,450 gallons) was about 27% less than the amount of fracturing fluid (207,550 gallons) used in Examples 2-6.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of hydraulically fracturing a hydrocarbon-bearing formation with fluids which comprises:
    (a) pumping into the formation a first fluid laden with proppant disposed in a superabsorbent polymer;
    (b) pumping into the formation a second fluid substantially free of proppant;
    (c) breaking the superabsorbent polymer with a breaker and releasing the proppant therefrom;
    (d) creating vertically extended pillars from the released proppant and creating conductive flow channels between the pillars; and
    (e) flowing fluids produced from the hydrocarbon-bearing reservoir at least partially through the channels between the vertically extending pillars.

2. The method of claim 1, wherein the superabsorbent polymer comprises a plurality of crosslinks.

3. The method of claim 1, wherein the superabsorbent polymer includes a repeat unit which comprises a polysaccharide, an acrylate, an acrylamide, a poly vinyl acetate, a derivative thereof, or a combination thereof.

4. A method of hydraulically fracturing a hydrocarbon-bearing subterranean formation which comprises:
    (a) pumping into the formation a fluid containing a breaker, the fluid being laden with proppant disposed in a crosslinked superabsorbent polymer;
    (b) pumping into the formation a fluid substantially free of proppant;
    (c) reacting the breaker with the superabsorbent polymer and breaking a bond in a polymer chain of the superabsorbent polymer, a bond in a crosslink of the superabsorbent polymer, a bond between a crosslink and a chain of the superabsorbent polymer or a mixture thereof;
    (d) releasing the proppant from the reaction product of step (c) and forming pillars from the released proppant; and
    (e) flowing fluids produced from the hydrocarbon-bearing reservoir at least partially through the channels between the vertically extending pillars.

5. The method of claim 4, wherein the superabsorbent polymer is a polysaccharide or contains repeating units of an acrylate, an acrylamide, a vinylpyrrolidone, vinyl acetate, vinyl alcohol, 2-acrylamide-2-methylpropanesulfonic acid or a derivative thereof crosslinked with a crosslinker.

6. The method of claim 4 wherein the rate of pumping of the fluid containing proppant and the fluid substantially free of proppant is substantially the same.

7. The method of claim 4 wherein the volume of the fluid containing proppant and the volume of fluid substantially free of proppant are substantially the same.

8. The method of claim 4, wherein the fluid containing proppant is an ultra lightweight proppant having an apparent specific gravity less than or equal to about 2.45.

9. The method of claim 4, wherein at least one of the following conditions prevail:
   (a) the proppant of the fluid with proppant is coated with a resin; or
   (b) the proppant of the fluid with proppant is a plastic bead.

10. The method of claim 4, wherein the relative permeability of the reservoir is less than about 1 mD.

11. The method of claim 10, wherein the permeability of the reservoir is less than about 0.1 mD.

12. The method of claim 4, wherein the proppant of the fluid with proppant is a coated plastic bead and further wherein the bead comprises a polystyrene divinylbenzene or a polyamide or a derivative thereof.

* * * * *